(12) United States Patent
Thorstensen

(10) Patent No.: US 7,214,301 B2
(45) Date of Patent: May 8, 2007

(54) FILTER OR FILTER-ELEMENT FOR MODIFIED ELECTRO-DIALYSIS (MED) PURPOSES

(76) Inventor: Bernt Thorstensen, Tennisveien 35, N-0777 Oslo (NO)

( * ) Notice: Subject to any disclaimer, the term of this patent is extended or adjusted under 35 U.S.C. 154(b) by 157 days.

(21) Appl. No.: 10/311,338

(22) PCT Filed: Jul. 3, 2001

(86) PCT No.: PCT/NO01/00282

§ 371 (c)(1),
(2), (4) Date: Jun. 26, 2003

(87) PCT Pub. No.: WO02/02214

PCT Pub. Date: Jan. 10, 2002

(65) Prior Publication Data

US 2004/0238448 A1 Dec. 2, 2004

(51) Int. Cl.
*B01D 57/02* (2006.01)

(52) U.S. Cl. ............... 204/520; 204/523; 204/529; 204/630; 204/634; 210/243; 210/321.72; 210/502.1; 210/651; 210/688

(58) Field of Classification Search ............... 210/263, 210/266, 490, 500.26, 502.1, 504, 506, 510.1, 210/638, 649, 650, 660, 688; 204/518–524, 204/630–640, 525–536; 96/8, 10–13; 55/524; 95/45, 90
See application file for complete search history.

(56) References Cited

U.S. PATENT DOCUMENTS

| | | | | |
|---|---|---|---|---|
| 5,154,809 A | * | 10/1992 | Oren et al. | 204/524 |
| 5,437,774 A | * | 8/1995 | Laustsen | 204/518 |
| 5,753,014 A | * | 5/1998 | Van Rijn | 96/12 |
| 6,284,124 B1 | * | 9/2001 | DiMascio et al. | 205/753 |
| 6,348,154 B1 | * | 2/2002 | Stewart | 210/653 |

* cited by examiner

*Primary Examiner*—Joseph Drodge
(74) *Attorney, Agent, or Firm*—Dennison, Schultz & MacDonald

(57) ABSTRACT

Filter or filter-element designated for Modified Electro-Dialysis (MED) purposes characterized in that the filter or filter-element comprises a porous, ceramic, mainly uniform material with functional, preferably ion selective groups grafted onto the inner, porous surface of the ceramic body. The outer surface of the filter or filter-element may be completely or partly covered by layers of porous, ceramic membranes with a pore size of less than 1 µm and thickness less than 1 mm, and/or anion, cation or bipolar groups or membranes. The thickness of the filter-element is larger than 1 mm and has pores of size larger than 1 µm. The invention also relates to a method for the manufacture of such a filter either continuously by tape-casting, extruding, rolling or calendaring or single-bodied by casting, pressing or forging, of a paste containing a non-conductive, ceramic material. The body is then sintered and finally grafted with functional, preferably ion selective groups for one or more specific ions or groups of ions, onto the inner, porous surface of the ceramic body. Use of the filter or filter-element for filtering ions or complexes of heavy or precious metals from water is also claimed.

8 Claims, 4 Drawing Sheets

FILTER OR FILTER-ELEMENT FOR MODIFIED ELECTRO-DIALYSIS (MED) PURPOSES

Figure 1:
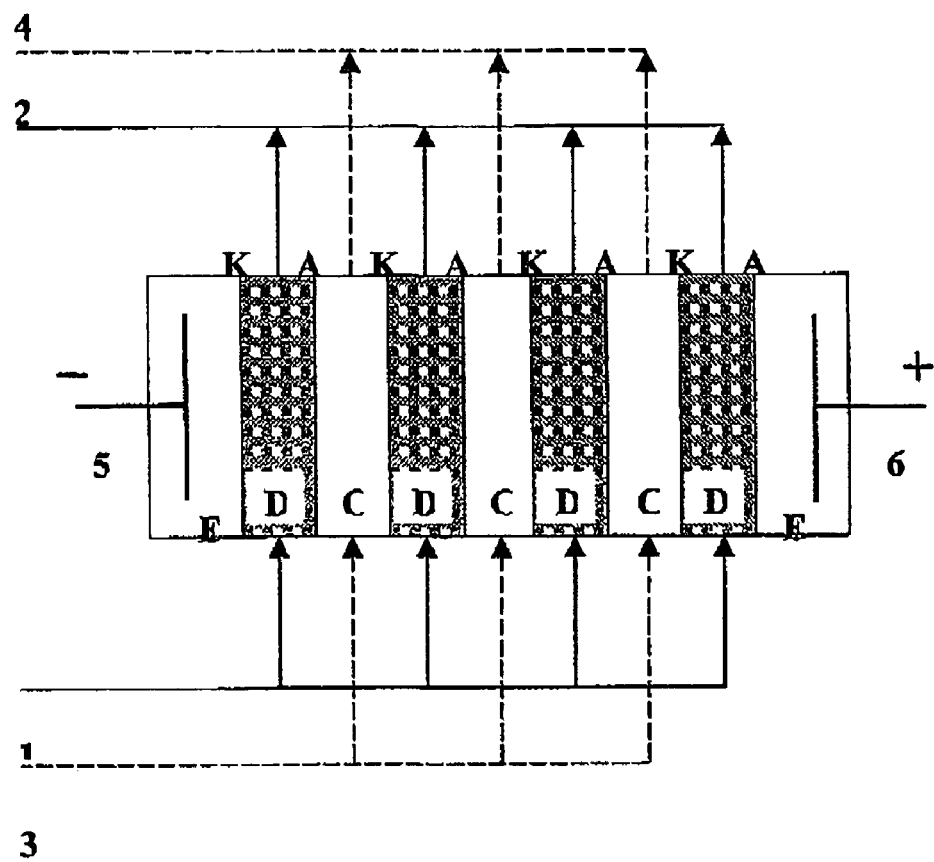

This application is a filing under 35 USC 371 of PCT/NO01/0282 filed Jul. 3, 2001.

BACKGROUND OF THE INVENTION

The invention relates to a filter or filter-element suited for Modified Electro-Dialysis purposes, particularly for purification or demineralizing of liquids with respect to impurities in the form of ions or ionic complexes of heavy metals or noble metals. The invention also includes a method for manufacturing such a filter or filter-element. The invention further relates to the use of such a filter or filter-element.

BACKGROUND

Heavy metals represent a problematic waste for several types of industries with concentrations that are often unacceptably high. The toxicity of many of these elements is very high and the tendency to contaminate the environment is a great concern.

Heavy metals generally represent a special environmental problem since the elements cannot be destroyed but must be isolated or reduced to their original, elementary state.

Historically heavy metal containing waste has mainly been treated chemically resulting in a hydroxyl- or sulphide-containing sludge that would have to be deposited. Such "end-of-pipe" solutions require large amounts of water aid chemicals, and hence create new environmental problems. Amongst the larger producers of this type of wastes are mineral processing industries and metal processing (galvanizing, plating, coating) industries.

Such waste deposits represent an increasingly growing problem for today's society; hence authorities in most industrialized countries have imposed restrictions and legal regulations for such waste emissions and depositions. European countries, headed by the European Union, have lately introduced new emission limits for heavy metals in industrial wastewater. These PARCOM limits—with corresponding US limits—will make up the future emission limits for industrial heavy metal emissions.

Due to increasing costs related to the deposit of industrial waste sludge, there is a growing interest in the industry for finding new solutions for recuperation and recycling of heavy meals in industrial processes. This will reduce costs for both waste handling and deposit and for the metal/metal complexes of the process. In addition the volume of deposits is reduced A corresponding situation exists for precious metals. Due to the high economical value of these metals it is found attractive to extract the minor amounts of metals that are found in the processing and rinsing waters.

Also for the ultra pure waters used for products and processing in various industries (e.g. semiconductor industry, pharmaceutical industry, other medical and health care industries and services), ions need to be removed from the process water streams.

For industrial wastewater "end-of-pipe" solutions are still the predominant. These solutions have, amongst others, the following disadvantages:
high water consumption,
high consumption of chemicals,
loss of costly metals and other chemical ingredients,
production of large amounts of environmentally toxic sludge,
costly transport and disposal of the sludge.

Alternative methods for purification of metal ion containing wastewater are: evaporation, reverse osmosis (RO), electrodialysis (ED), ion exchange (IE) and electrolysis. These are all established methods, but none of them are able to meet the PARCOM-limits alone.

Modified Electrodialysis (MED) is a combination of ED and IE. The method utilizes, in principle, the equipment from electrodialysis, with an alternating arrangement of anion and cation membranes. The ion exchanger is confined between a specific set of these membranes and may be responsible for the selectivity of the method and the ability to treat very diluted liquids. This is described in detail below, with reference to FIG. 1.

MED is a new method for a continuous and selective recuperation and removal of metal ions from wastewater, which is capable of meeting the PARCOM-limits.

A similar method is used for purification of water to be used as process water with extreme requirements to purity and lack of ions of any kind (e.g.: semiconductor industry, pharmaceutical industry, other medical and heal care industries and services). This non-selective process is named in the literature as EDI (Electro DeIonization) or CEDI (Continuous EDI).

Historically the EDI/CEDI concept is relatively old. The first reports and patents date back to the mid 1950's when the method was developed in order to purify wastewater from nuclear plants of radioactive elements. The first patents are registered by P. Kollsman (U.S. Pat. No. 2,815,320), R. G. Pearson (U.S. Pat. No. 2,794,777), T. R. E. Kressman (U.S. Pat. No. 2,923,674) and E. J. Parsi (U.S. Pat. No. 3,149,061).

In the 1970's the EDI/CEDI-process was reinvented with the aim to produce ultra-pure water and to purify potable water. In the middle of the 1980's the first commercial CEDI units were launched into the market, headed by Millipore, cf. U.S. Pat. No. 4,632,745.

Today's CEDI equipment utilizes either mixed-bed or single-bed ion exchangers confined by a combination of anion and/or cation membranes, see e.g.: WO 98/11987. Also the utilization of bipolar membranes is documented, see U.S. Pat. No. 4,871,431 and U.S. Pat. No. 4,969,983.

Common to all the different CEDI concepts is that the active cells are constructed by a multiplicity of separate components, which introduces a mix of organic and inorganic elements of varying strength, wear properties and stability, see e.g.: WO 95/29005. Important parameters for cell construction—in addition to low electrical resistivity—are mechanical, thermal, and chemical stability, which should all be high. Consequently the construction of compartments for liquid flows (both the diluted and concentrated flows) is important. Generally supports and/or spacers are used in order to meet the very narrow geometrical specifications necessary to ensure homogeneous flow patterns and low electrical resistance. This is described in several patents, both with respect to systems solution, see e.g.: WO 97/25147, EP 853,972, and U.S. Pat. No. 5,681,438, and with respect to supports and spacers, see e.g.: EP 645,176 and U.S. Pat. No. 4,804,451.

SUMMARY OF THE INVENTION

It is an object of the invention to provide a uniform, mechanically strong, and mechanically, thermally and chemically stable filter or filter element suitable for removal of ions or ion complexes of heavy or precious metals from liquids.

It is also an object of the invention to provide a filter or filter-element where the flow pattern for the liquid is sufficiently homogeneous and open (permeable).

It is a further object of the invention to provide a method for the manufacture of such a filter or filter-element, where the production cost is within acceptable and competitive limits.

The above mentioned objects are achieved by the filter or filter-element according to the invention, which constitutes a new filter-element to MED-systems (including EDI/CEDI) acting as a homogeneous and single replacement for the complete diluting, concentrate, and/or electrode compartments, including the combination of the specific ion exchanger with container, support, spacer, and anion/cation membranes.

Advanced ceramic products are today manufactured by first making a dough or paste consisting of: 40–60% ceramic powder, 2–10% binder, 2–10% softener, 1–2% dispersant, and 40–60% solvent. This dough or paste can be formed plastically into products or bodies ("green-bodies"[1]) either continuously by tape-casting, extruding, or calendering or single-bodied by casting, pressing or forging preferably such that the geometry and shape is accurately defined. Thereafter, the "green-bodies" are sintered or fired at high temperatures. During this sintering process all organic components disintegrate, leaving only a fully ceramic finished product.

Filter-elements manufactured by this method may have an arbitrary geometry, varying from highly regular circles, ellipses, squares, rectangles etc. to highly irregular free forms.

BRIEF DESCRIPTIONS OF THE DRAWINGS

Figure 2:
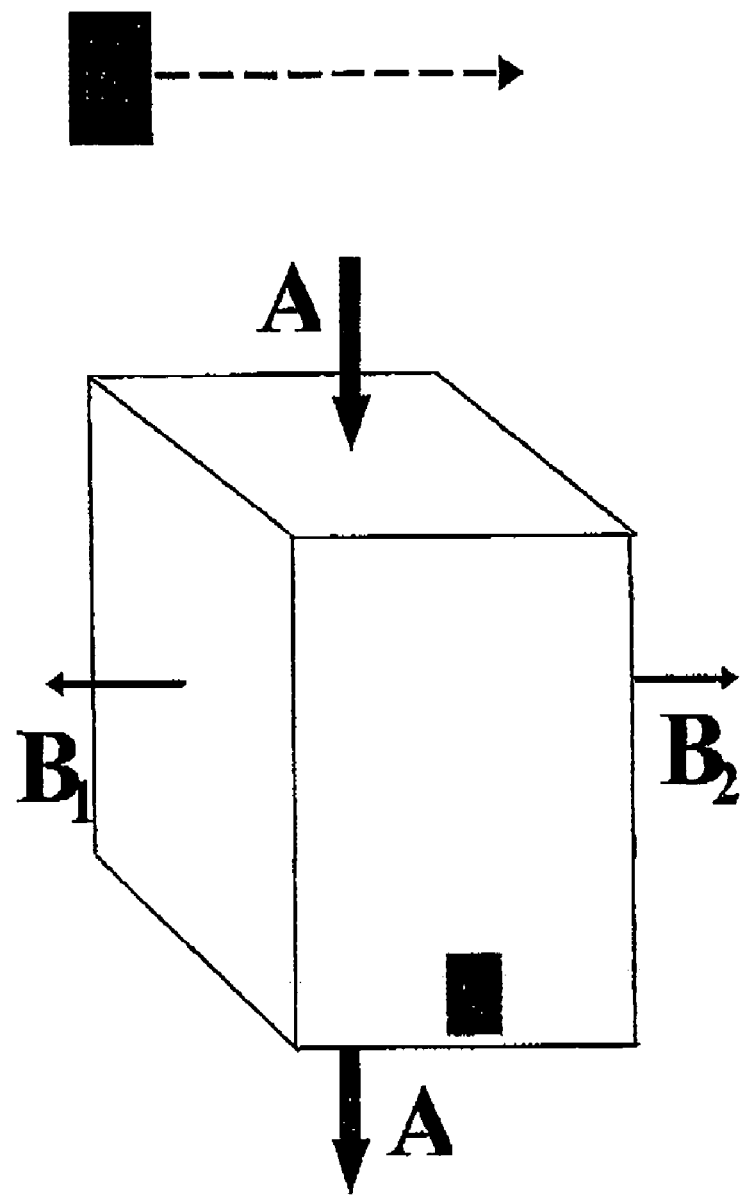
Figure 3:
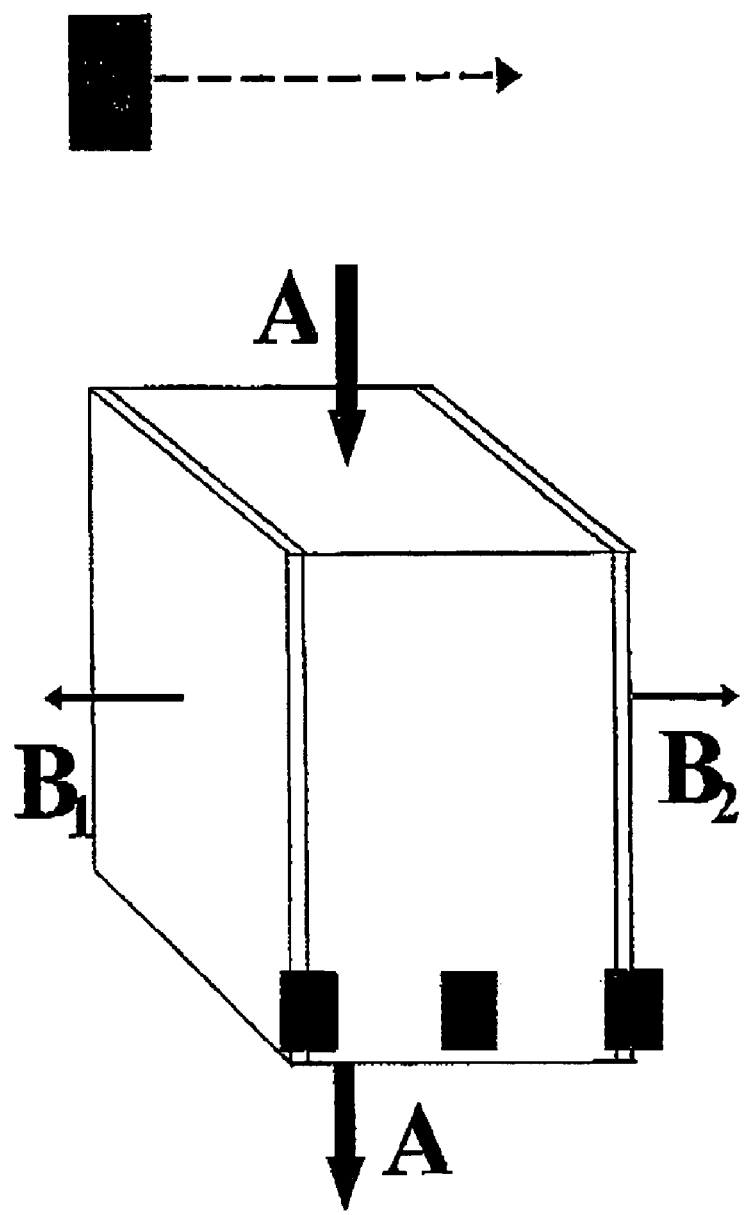
Figure 4:
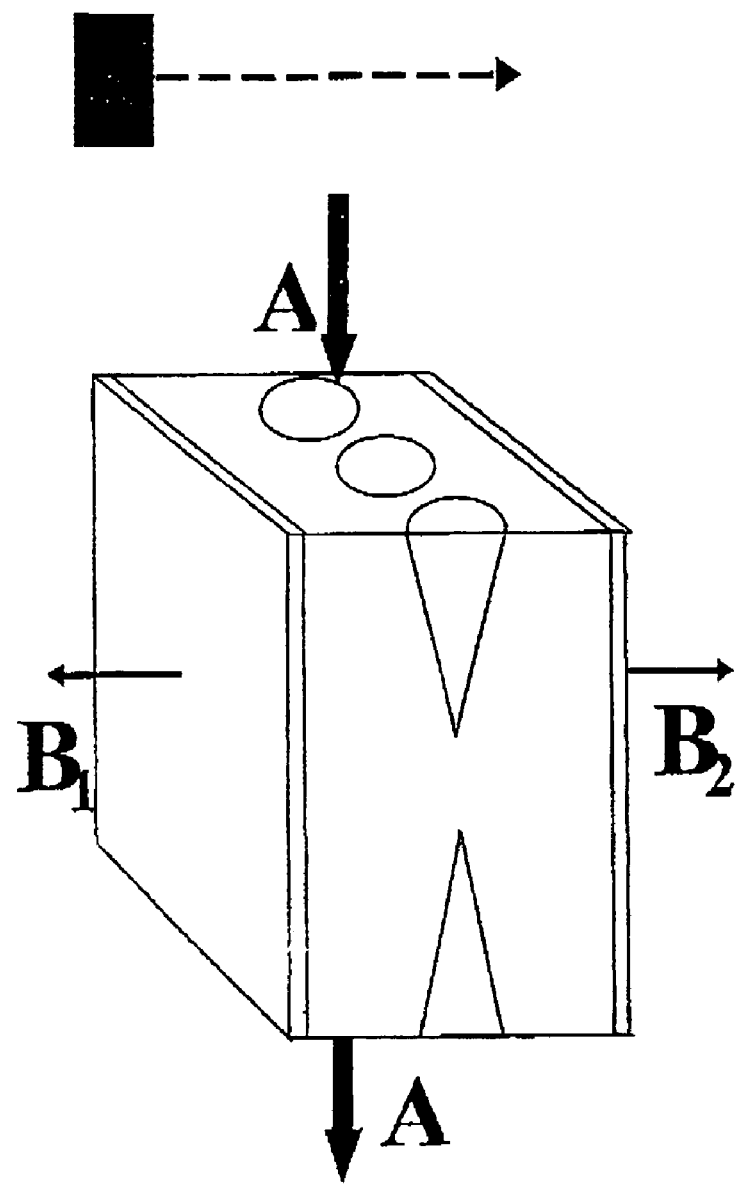

In the following the invention is described in detail, including examples with reference to the enclosed figures, where:

FIG. 1 shows a principal view of a typical layout of a Modified Electro-Dialysis (MED) system according to known technology, FIG. 2 shows a sectional view of a filter-element according to the invention, FIG. 3 shows a sectional view of a filter according to the invention, including the filter-element of FIG. 2 covered by thin anion/cation membranes (if necessary including: thin, ceramic, porous membrane layers with ion-selective groups) on two of the surfaces of the filter-element, and FIG. 4 shows a sectional view of a filter comprising one type of inner drainage channels.

FIG. 1 shows the layout of a Modified Electro-Dialysis (MED) system, which is a technology inherited from Electro-Dialysis (ED), wherein alternating anion and cation membranes constitute compartments or chambers for different liquid flows. In FIG. 1 these compartments are marked C for concentrate, D for diluting (or clean liquid) and E for electrode. Further, 1 indicates the feed flow (or diluted) in, 2 diluted out, 3 concentrated in, 4 concentrated out, whereas 5 and 6 are the electrodes. The feed flow to be cleaned (diluted) 1, is fed into the diluting compartments D. During passage through the diluting compartments D, the electric field, $\in$, will conduct the charged anions and cations of the feed flow in opposite directions out of the diluting compartments through the anion and cation membranes respectively. The anion membranes prevents cations from moving from the concentrate compartments into the neighbouring diluting compartments, and similarly the cation membrane prevents the anions from moving from the concentrate compartments into the neighbouring diluting compartments. This is how ED functions without the use of an ion exchanger. For very low concentrations of impurities (ions) the function and efficiency of the ED process is strongly reduced. This is due to the low conductivity of the liquid at low ion concentrations. In order to resolve this problem the MED technology introduces ion exchangers in the diluting compartments D, alternatively also in the concentrate compartments C. The ion exchanger will then absorb/extract the available metal ions, which will increase the charge density in the diluting (and concentrate) compartments and, assuming that the absorbed ions are sufficiently mobile, the electric field will still effectively be able to conduct the charged ions out of the diluting compartments through the anion and cation membranes. Without the ion exchanger the efficiency of the process will be strongly reduced and the costs and the energy consumption will strongly increase.

FIG. 2 shows a sectional view of the filter-element of this invention, showing a homogeneous core (k) that constitutes the filter-element in the form of a substrate made of porous, ceramic, non-conducting material with large pores. The preferred size for these pores is at least 1 μm in order to reduce the flow restriction for the liquid flows. A represents the feed flow (e,g, diluted), and $B_1$ and $B_2$ are the flows of anions and cations being conducted out of the diluting compartment by the electrical field, $\in$. This single filter-element constitutes the structure of the diluting compartment, the concentrate compartment and the electrode compartment respectively, and ensures the mechanical and chemical properties. The filter-element has the similar functional properties as the ion exchanger used in conventional CEDI systems. This is achieved by grafting the preferred functional groups onto the complete inner surface of the porous, ceramic filter-element. The grafted groups may be selective to specific metal ions or not The filter-element described in FIG. 2 will however not confine the liquid flows but be open to leakage through the outer surfaces of the element. Hence, this element can only exceptionally act as a complete filter.

A typical thickness of the filter-element is between 1 and 10 mm, depending on the mechanical and functional demands on the element. For mixed-bed (both anion and cation groups grafted on the same element) applications the thickness must be limited due to transport properties. However for single-bed (only one type of active groups grafted on the same element) applications the thickness may preferably be high in order to increase the capacity and reduce the flow speed.

In order to "close off" one or more of the outer surfaces of the filter-element of FIG. 2, membranes of anionic, cationic, or bipolar nature may be applied on these surfaces as described below. In such cases a reduced pore size close to the outer surface of the element may be preferred. This can be achieved by applying one or more thin ceramic membrane layer(s) with the desired pore size. The methods for applying these layers may be: tape-casting, spraying, slip casting, screen-printing, gel-casting, or sol-gel coating. After drying the applied layers are sintered at high temperature, yielding porous fully ceramic membrane layers.

The selected, functional (e.g.: ion-selective) molecular groups are then grafted onto the complete, internal surface of the filter-element (with or without the outer ceramic membrane layers). The choice of the functional groups depends upon the element(s) to be removed from the liquid flow. Two common active, non-selective groups are complexes of sulphonate and ammonium. However the supply of commercially available (low and high selectivity, strong and weak) groups and complexes of organic and inorganic nature is large, and all such groups are applicable in principle. Depending upon the actual structure of the active group, these can be grafted either directly onto the inner surface of the filter-element by chemical, physical, or physio-chemical methods or indirectly with the aid of coupling reagents. These coupling reagents are organic or inorganic molecular groups preferably containing silicon, titanium, phosphorous, boron, sulphur or nitrogen, and may be e.g. silanes, titanates, phosphates or others. The purpose of the coupling reagent is to create a tight and stable binding to the inner surface of the ceramic filter-element. In special cases also radiation, e.g.: UV-, X-ray, γ-, or elementary particle-radiation, may be applied in order to improve the binding.

When the filter-element material is alumina ($Al_2O_3$) this material is known to have elementary OH-groups attached to the surface:

—Al—OH.

Sometimes the alumina surface has to be activated. The purpose of this activation is to create the maximum number of OH-groups on the surface.

If the coupling reagent is a silane ($R_{(1)}$—Si—$R_{(2)}$) one of the groups ($R_{(1)}$) of the silane will react with one or more OH-groups on the alumina surface to e.g. $H_nR_{(1)}$ leaving in principle the following binding towards the alumina surface:

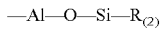
—Al—O—Si—$R_{(2)}$

The other silane-group ($R_{(2)}$) can then be utilized as a coupling reagent towards the active group, e.g. iminodiacetic acid (IDA), where X is a reaction product:

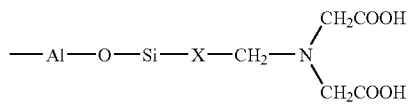

This grafting of the active, functional groups on the entire inner surface of the filter-element can be done with a sufficient density of functional groups (in the order of 1 meq/ml) compared with most of the conventional ion exchanger resins. The method of application of the groups can be either deposit from gas phase, liquid phase, or a solid state reaction.

FIG. 3 shows a cut through the filter-element according to the invention, which consists of a homogeneous core (k) that constitutes the filter-element in the form of a substrate made of porous, ceramic, non-conducting material with large pores, with thin layers (1) on two of the outer sides of the element consisting of porous, ceramic membranes with fine pores. On the entire inner surface of this filter or filter-element is grafted active functional chemical groups. In the outer layers (1) may also be incorporated anion, cation or bipolar membranes. This can be achieved either by grafting of single groups as described above, or by applying monomeric groups that can polymerize on the surface. In special cases radiation, e.g.: UV-, X-ray, γ-, or elementary particle-radiation, may be used in order to complete the polymerization. With a suitable pore size distribution for the outer, ceramic membrane layers, these grafted or applied groups will be able to close off the pores and behave as dense anion, cation or bipolar membranes, The preferred pore size of the outer, ceramic membrane layer (1) is less 1 μm, so that the applied anion, cation or bipolar membranes should not penetrate too deep into the structure, thereby not forming tight membranes. In this way the filter or filter-element according to the invention will replace the whole structure of the diluting, concentrate and/or the electrode compartment in a conventional MED (EDI/CEDI) system with one single, ceramic, functional filter.

The filter-element (k) and the membrane layers (1) can in principle be manufactured by all types of ceramic material. However, based upon availability, price and their properties the preferred ceramic materials are $Al_2O_3$, $TiO_2$, $ZrO_2$, $SiO_2$, or combinations, mixtures or phases derived from these.

FIG. 4 shows a cut through a filter with one type of internal drainage channels. The introduction of different drainage channels may improve the flow passage through the filter-element, and hence reduce the flow resistive for the liquid passing through the element. This can be achieved during the manufacturing process when the filter-elements are in the "green" state by purely mechanical means or by inserts organic templates into the "green-bodies" that will disintegrate during the sintering cycle. The use of such drainage channels represents in many cases the preferred embodiment of the invention. If the application so demands, the drainage channels may be made so large that the filter-element may be split into two or more separate parts.

Although the invention is exemplified by means of references to the enclosed drawings, it is to be understood that the invention can be modified in may different manners without departing from the general scope of the invention. The invention is only limited by the claims.

For example, membrane layers (1) are shown only on two sides of the filter-element in the illustrations while some applications may demand membrane layers on three or four sides, or simply one side. For other applications the membrane layer may only constitute a ceramic, porous membrane without the anion, cation, or bipolar membrane embedded.

There are also applications where these layers are not necessary, in which case the filter-element (k) constitutes the complete filter.

Other inorganic or ceramic ion-selective membranes have been documented and patented. These are however all thin sheet membranes constituting cation membranes, see e.g.: Ikeshoji (JP 1-47403) and Oya (JP 4-135645), or composite (supported) membranes, see e.g.: Bray (WO 96/10453), Kasbiwada (U.S. Pat. No. 5,087,345), Horie (JP 3-232521), and Hying (NO 2000 0437). These membranes can act as improved anion and cation membranes in conventional ED and MED systems, but they cannot replace the whole thick sheet, multifunctional, uniform, ceramic filter or filter-element of the present invention.

Most practical filter systems will consist of multiple single filters or filter-elements stacked in line as indicated in FIG. 1. The present, functional filter can then either replace only the diluting compartment, or both the diluting and the concentrate compartments, and if necessary also the electrode compartment. Usually it will be convenient to mount the filters in a holder or cassette of some kind, in order to keep the flow paths closed and leakage free, and also to prevent the filter or filter-element from becoming exposed to unwanted, external strains or interactions.

It is also possible to use filters with a shape that deviates from those shown with rectangular geometry and constant thickness, even if these and circular filters constitute the most practical geometries, both with respect to their manufacture and use.

The most pronounced advantages with the new ceramic filter according to the present invention are that:

i) it constitutes a well-defined diluting/concentrate/electrode compartment with geometrically stable properties that will not be changed or restructured under mechanical, electrical or chemical impact,
ii) it can host a high density of active, functional groups in the core of the filter,
iii) it functions as a support (and spacer) for the outer anion, cation and/or bipolar membranes,
iv) it exhibits good bonding properties between the core element and the outer anion, cation and/or bipolar membranes, and
v) the variation and combination possibilities are large.

The invention claimed is:

1. An apparatus for Modified Electro-Dialysis (MED), comprising:
   a plurality of adjacently arranged Modified Electro-Dialysis (MED) filter-elements, with alternating diluting elements and concentrating elements separated by anionic and cationic membranes;
   each of the diluting elements including an inlet for liquid containing impurities to be cleaned, and an outlet for cleaned liquid, liquid flow within the diluting elements taking place from the inlet to the outlet;
   each of the concentrating elements including an inlet for clean liquid and an outlet for liquid containing impurities, liquid flow within the concentrating elements taking place from the inlet to the outlet; and
   means for producing an electric field for conducting anions and cations in opposite directions out of the diluting elements into the concentrating elements,
   wherein at least one of the diluting elements is a Modified Electro-Dialysis filter element comprising a sintered porous ceramic material body having a substantially uniform structure with functional groups grafted onto inner, porous surfaces of the ceramic body.

2. Apparatus according to claim 1, wherein at least one of the concentrating elements is a Modified Electro-Dialysis filter element comprising a sintered porous ceramic material having a substantially uniform structure with functional groups grafted onto inner, porous surfaces of the ceramic body.

3. Apparatus according to claim 1, wherein the plurality of Modified ElectroDialysis filter elements are arranged with parallel axes, and the liquid flow from the inlet and outlet of each of the filter elements takes place parallel to the axes.

4. Apparatus according to claim 3, wherein the electric field is applied perpendicular to the direction of liquid flow.

5. Method for removal of heavy metal ions from a liquid, comprising passing the liquid through a first Modified Electro-dialysis filter-element constructed and arranged for liquid flow between an inlet and an outlet, and arranged adjacent to a second Modified Electro-dialysis filter-element through which clean liquid is passed between an inlet and an outlet, and
   applying an electric field to the liquid flow to cause the heavy metal ions to move from the first Modified Electro-dialysis filter-element, into the second Modified Electro-dialysis filter-element,
   wherein at least the one Modified Electro-dialysis filter-element comprises a sintered porous ceramic material body having a substantially uniform structure with functional groups grafted onto inner, porous surfaces of the ceramic body.

6. Method according to claim 5, wherein the second Modified Electrodialysis filter-element comprises a sintered porous ceramic material body having a substantially uniform structure with functional groups grafted onto inner, porous surfaces of the ceramic body.

7. Method according to claim 5, wherein the liquid flow takes place in a direction parallel to a longitudinal axis of each said Modified Electro-dialysis filter-element.

8. Method according to claim 7, wherein the electric field is applied in a direction perpendicular to said longitudinal axis.

* * * * *